United States Patent
Ackerman

(10) Patent No.: US 7,162,475 B2
(45) Date of Patent: Jan. 9, 2007

(54) METHOD FOR USER VERIFICATION AND AUTHENTICATION AND MULTIMEDIA PROCESSING FOR INTERACTIVE DATABASE MANAGEMENT AND METHOD FOR VIEWING THE MULTIMEDIA

(76) Inventor: David M. Ackerman, 9590 Chesapeake Dr. Suite 116, San Diego, CA (US) 92123

(*) Notice: Subject to any disclaimer, the term of this patent is extended or adjusted under 35 U.S.C. 154(b) by 22 days.

(21) Appl. No.: 10/417,689

(22) Filed: Apr. 16, 2003

(65) Prior Publication Data

US 2003/0200217 A1 Oct. 23, 2003

Related U.S. Application Data

(60) Provisional application No. 60/373,697, filed on Apr. 17, 2002, provisional application No. 60/373,736, filed on Apr. 17, 2002.

(51) Int. Cl.
G06F 17/30 (2006.01)
(52) U.S. Cl. .................... 707/9; 707/3; 707/104.1; 713/186
(58) Field of Classification Search .............. 707/3, 707/4, 9, 10, 102, 104.1; 709/203, 219, 204; 713/186, 202; 382/115, 117, 118
See application file for complete search history.

(56) References Cited

U.S. PATENT DOCUMENTS

| | | | |
|---|---|---|---|
| 5,404,505 A | 4/1995 | Levinson | |
| 5,802,156 A | 9/1998 | Felger | |
| 5,892,824 A * | 4/1999 | Beatson et al. | 713/186 |
| 5,956,716 A | 9/1999 | Kenner | |
| 5,987,440 A | 11/1999 | O'Neil | |
| 6,029,195 A | 2/2000 | Herz | |
| 6,061,681 A | 5/2000 | Collins | |
| 6,195,699 B1 | 2/2001 | Dennis | |
| 6,256,737 B1 | 7/2001 | Bianco | |
| 6,263,463 B1 | 7/2001 | Hanna | |
| 6,268,788 B1 * | 7/2001 | Gray | 340/5.2 |
| 6,269,394 B1 | 7/2001 | Kenner | |
| 6,470,338 B1 * | 10/2002 | Rizzo et al. | 707/6 |
| 6,594,502 B1 * | 7/2003 | Koester | 455/414.1 |
| 6,678,663 B1 * | 1/2004 | Mayo | 705/14 |
| 6,735,568 B1 * | 5/2004 | Buckwalter et al. | 705/1 |
| 6,775,776 B1 * | 8/2004 | Vogt et al. | 713/186 |
| 2001/0034720 A1 * | 10/2001 | Armes | 705/65 |
| 2001/0047294 A1 * | 11/2001 | Rothschild | 705/14 |
| 2002/0019829 A1 | 2/2002 | Shapiro | |
| 2002/0034319 A1 * | 3/2002 | Turney et al. | 382/116 |
| 2002/0116458 A1 * | 8/2002 | Bricklin et al. | 709/204 |
| 2003/0088479 A1 * | 5/2003 | Wooten et al. | 705/26 |
| 2003/0093405 A1 | 5/2003 | Mayer | |
| 2003/0163709 A1 | 8/2003 | Milgramm | |
| 2003/0231785 A1 * | 12/2003 | Rhoads et al. | 382/100 |
| 2004/0158723 A1 | 8/2004 | Root | |
| 2004/0260657 A1 * | 12/2004 | Cockerham | 705/76 |

* cited by examiner

Primary Examiner—Leslie Wong

(57) ABSTRACT

A method for verifying specific profile, legal, and social preference data responses for generating a selectively approved membership database. Membership security is completed with a biometric security authentication of each member upon member logon. A media player is used for recording and delivering video on demand; live video broadcast communications, and video/audio relational database management as well as searching the database for Digital video and audio content defined by indexed unique hint track data. Live video conferencing is available utilizing bandwidth scheduling methods for quality video control and creating audit logs for member accountability and content control.

21 Claims, 12 Drawing Sheets

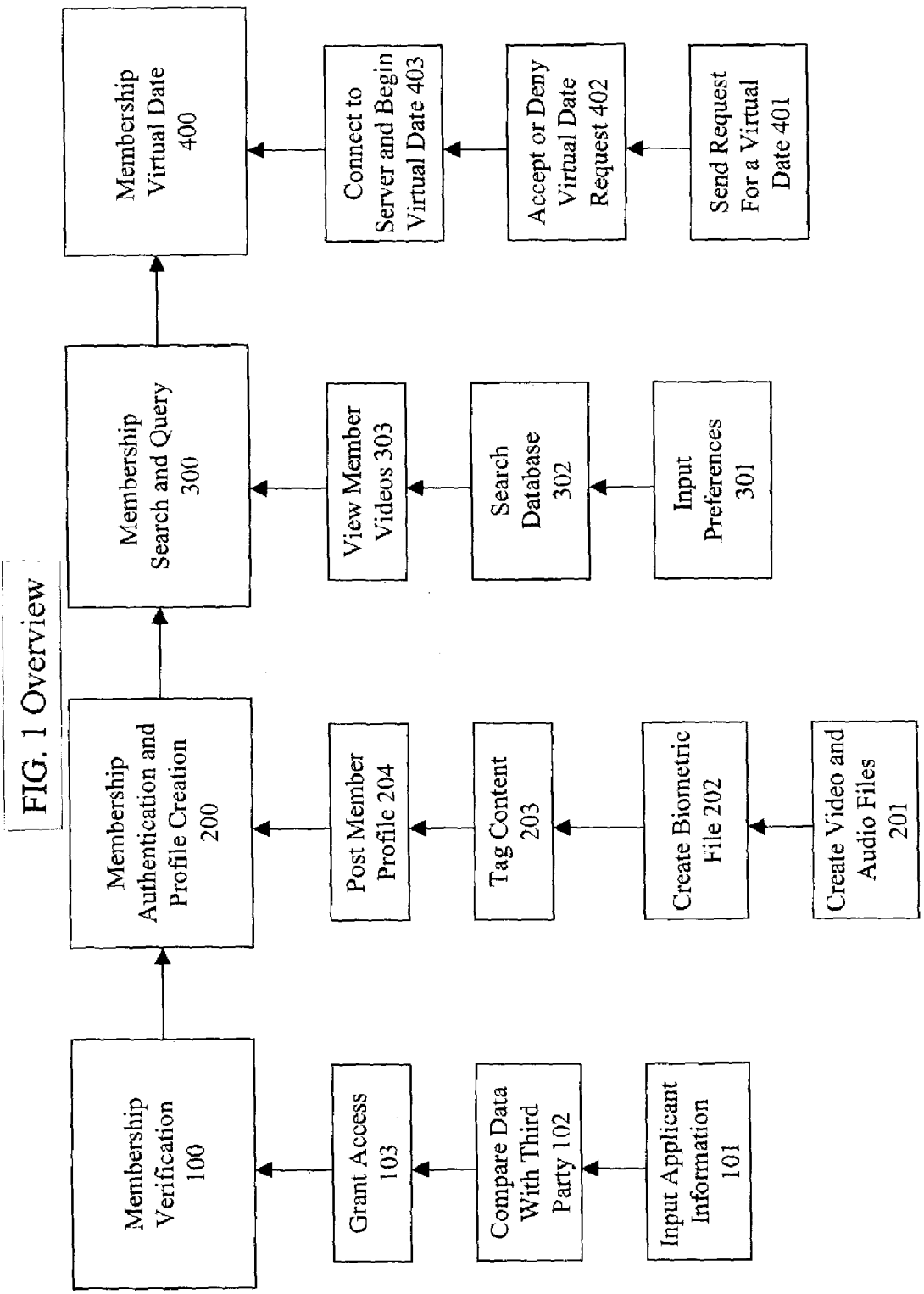
FIG. 1 Overview

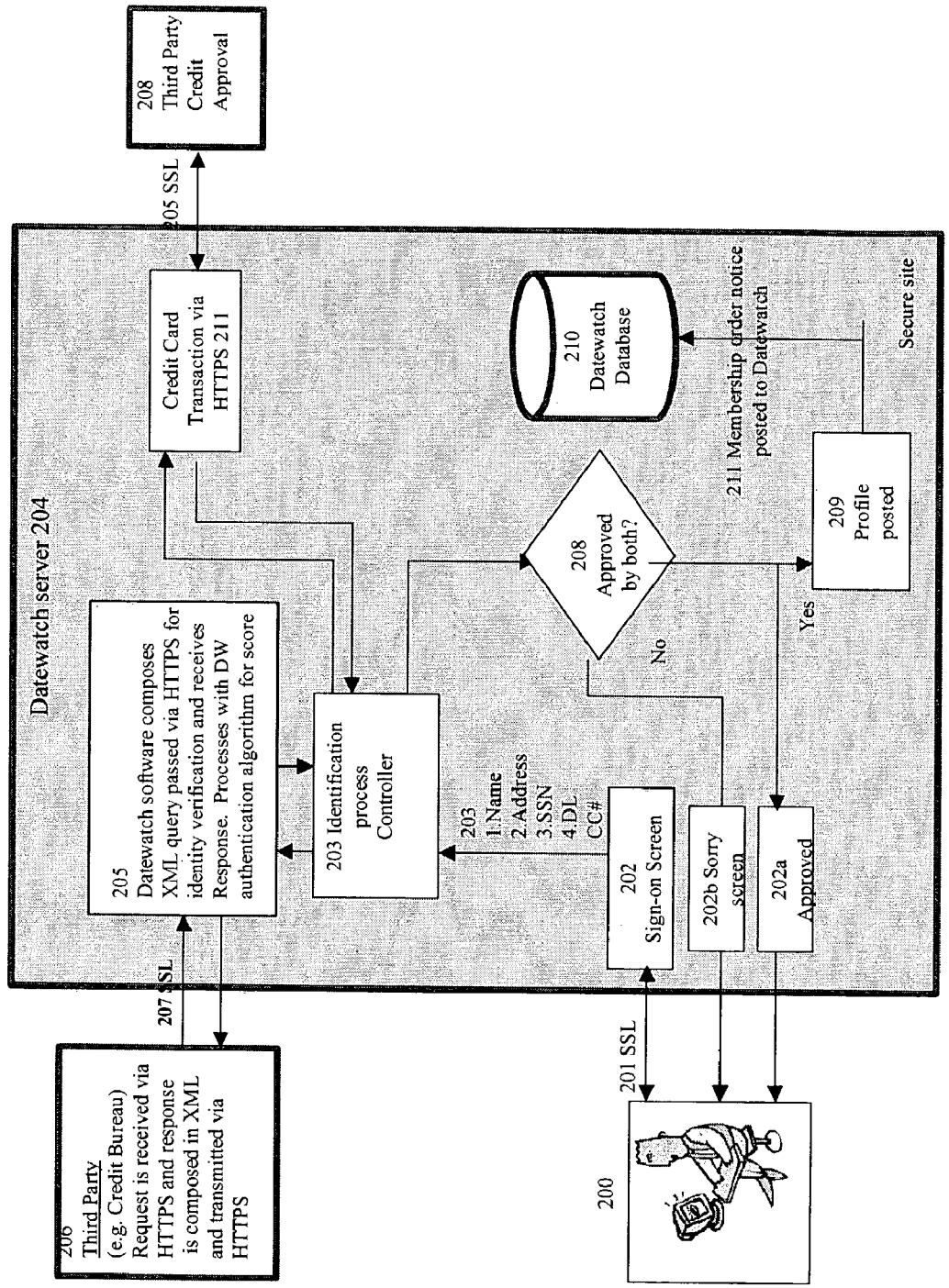
FIG. 2: MIV - Membership Identity Verification

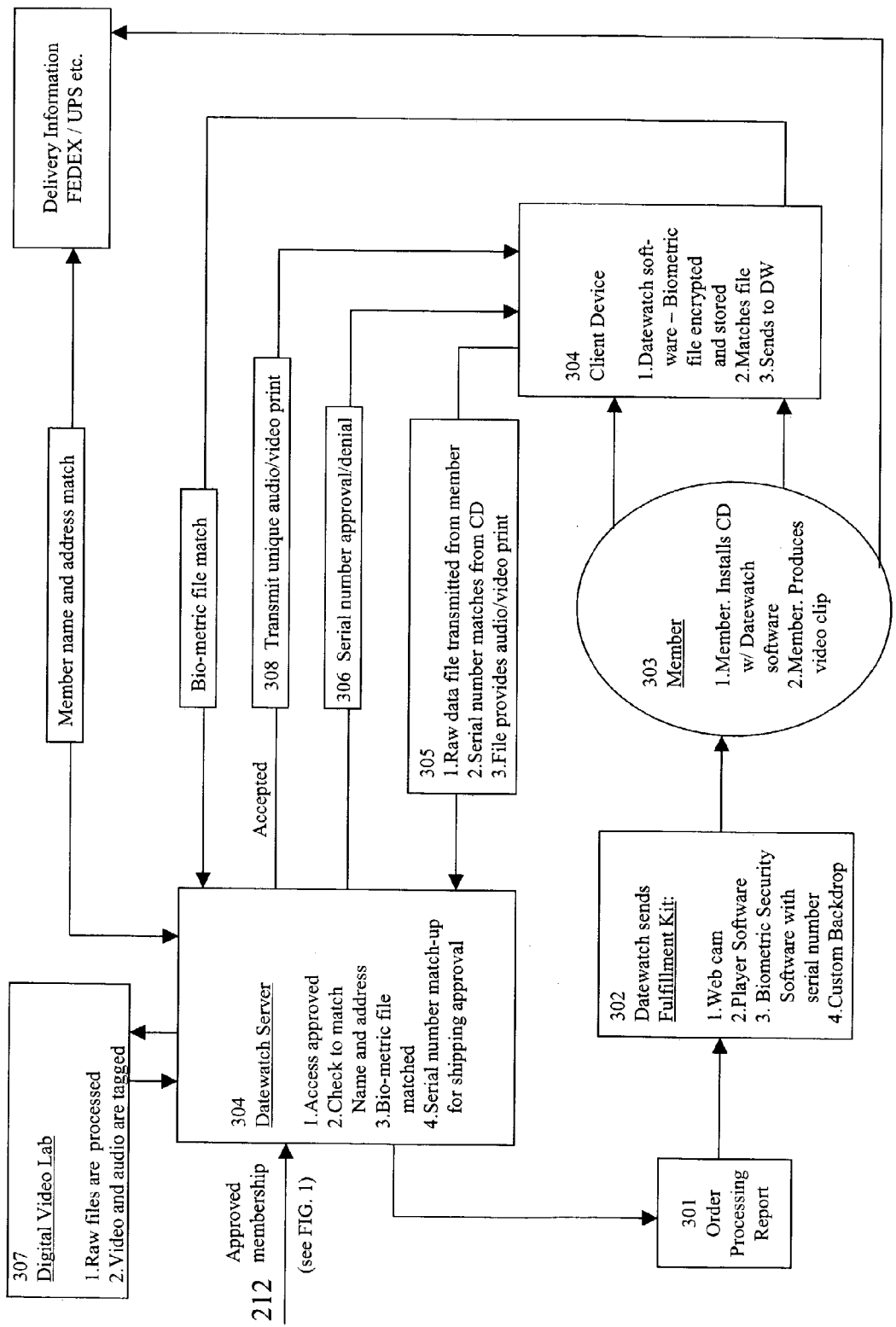
FIG. 3 Security Authentication

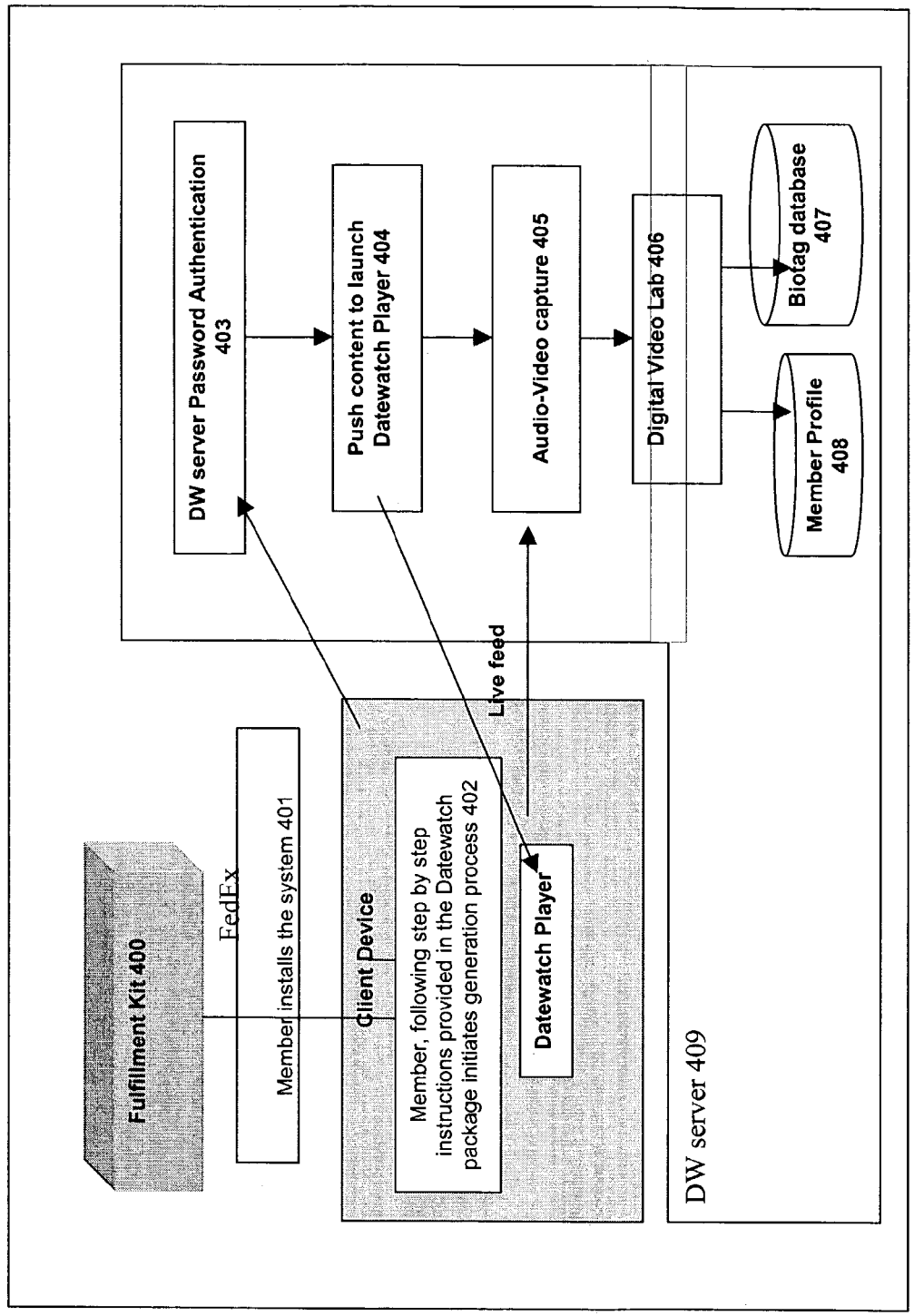
FIG 4 Biometric Creation

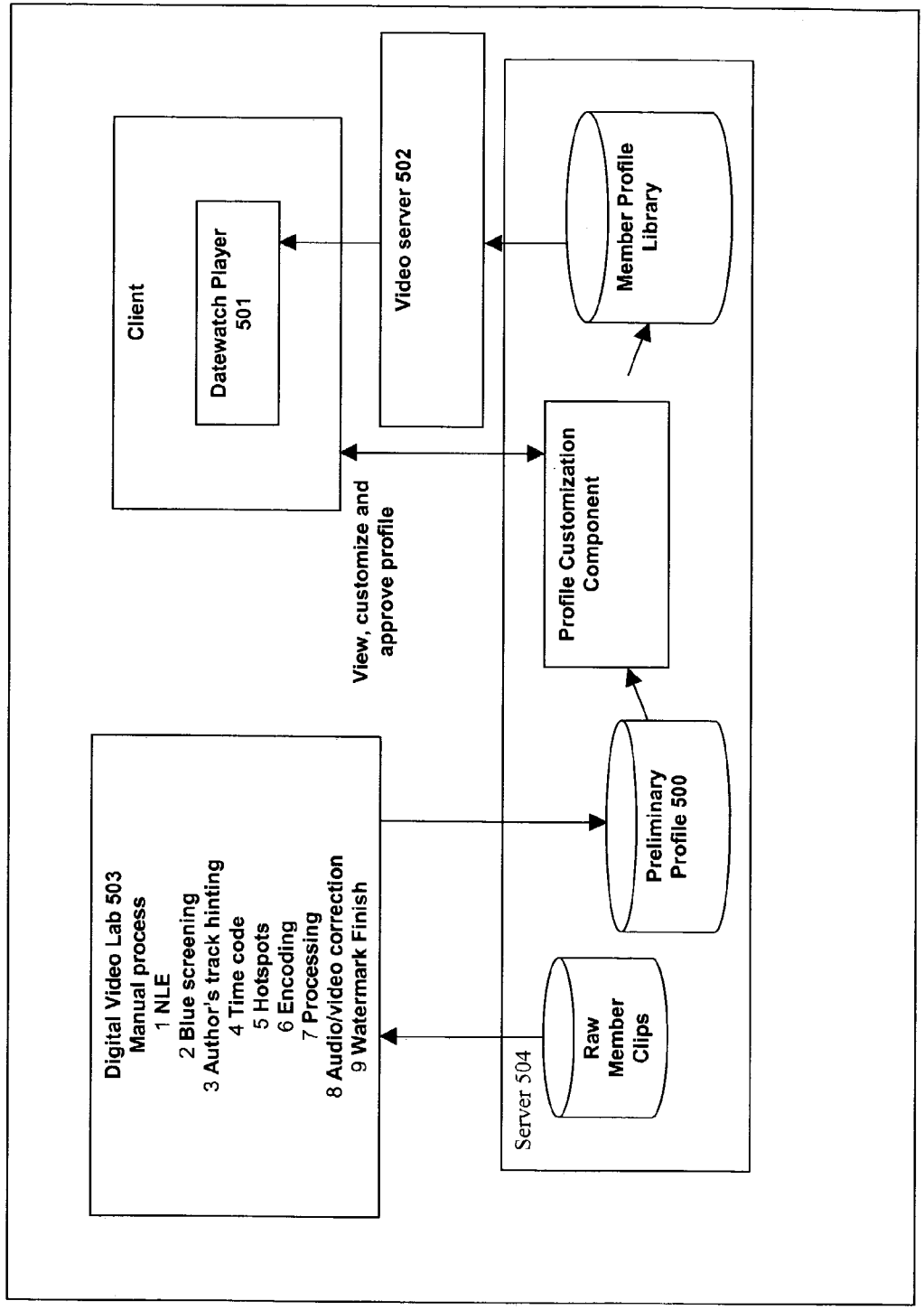
FIG. 5. Digital Video Processing

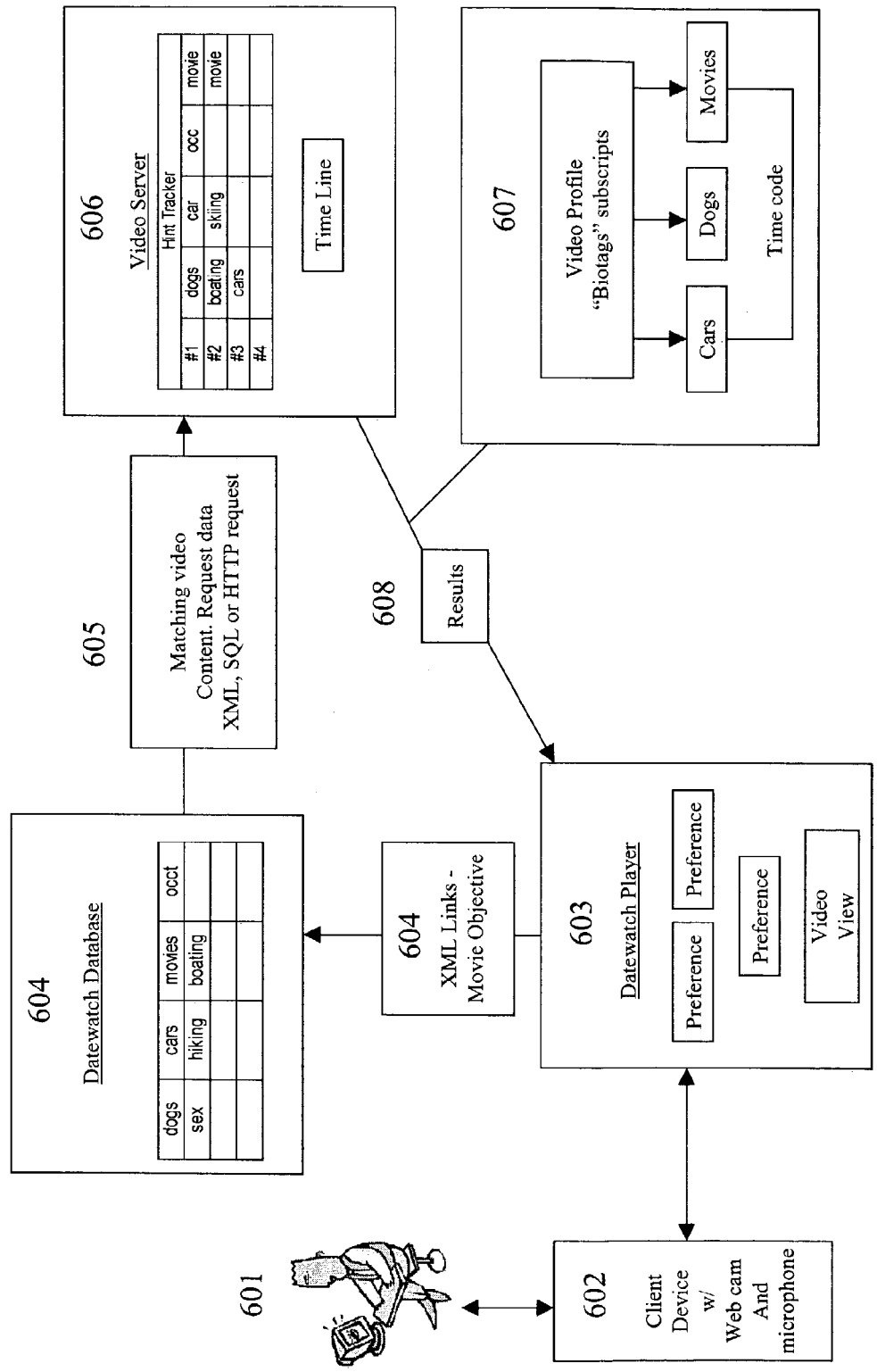
FIG. 6 Datewatch Player - Interactive Video Database (schema/query)

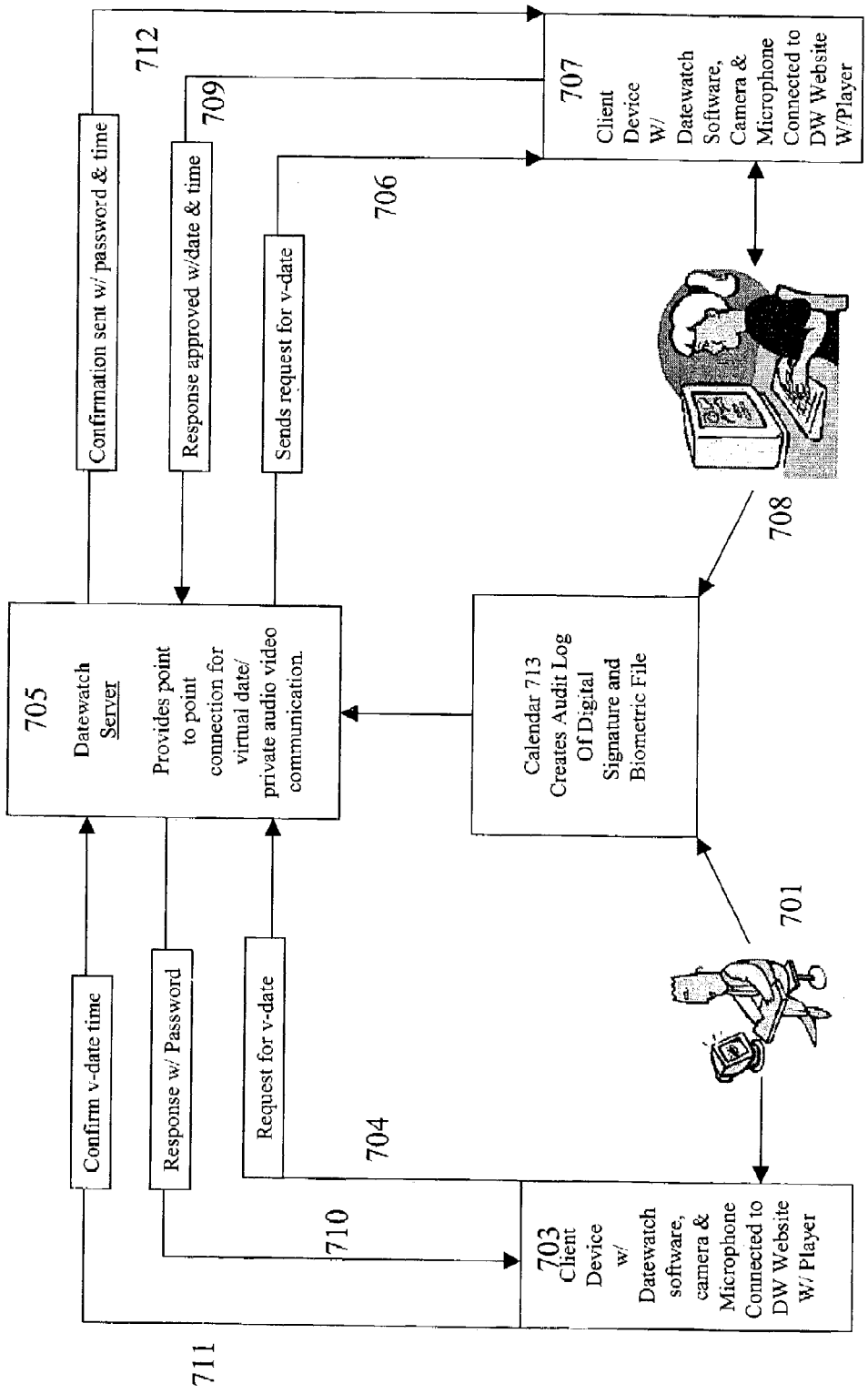
FIG. 7 Virtual Date through Datewatch Player

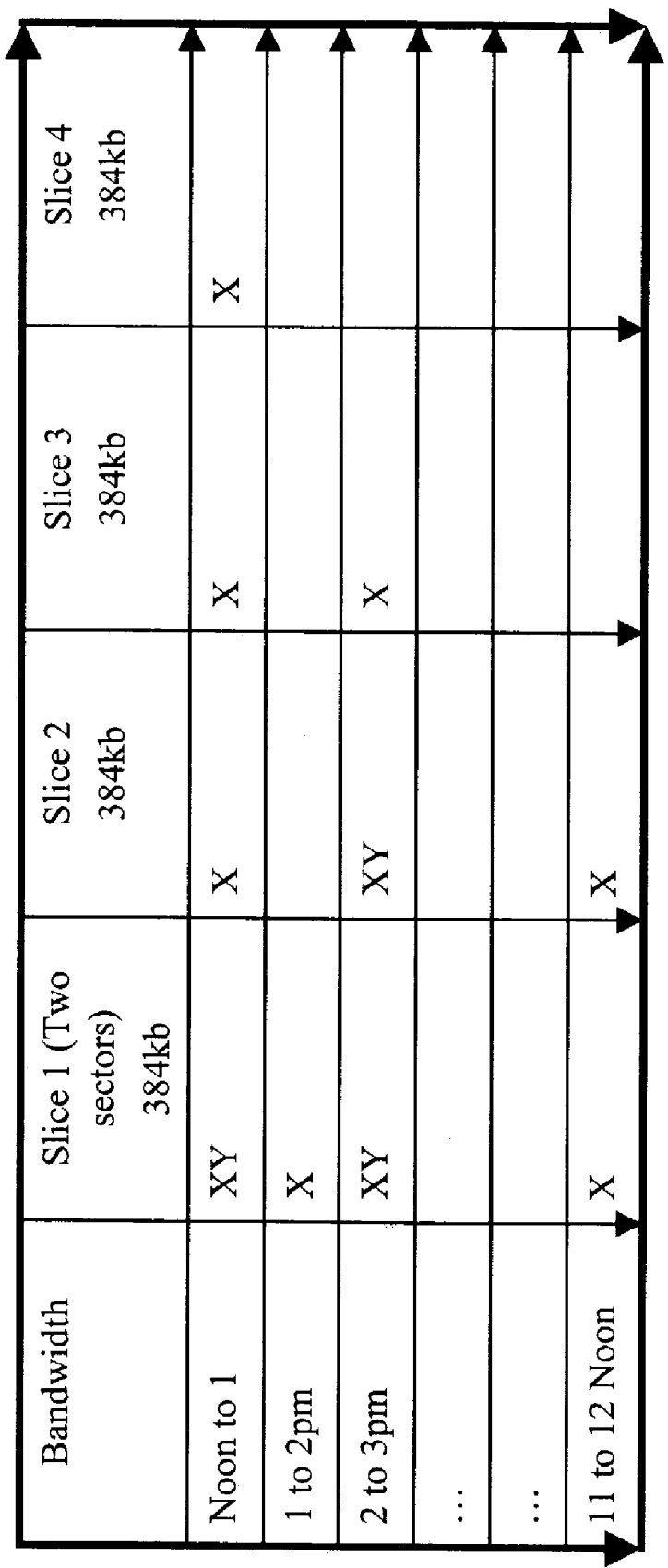
FIG. 8 Bandwidth Scheduler
| Bandwidth | Slice 1 (Two sectors) 384kb | Slice 2 384kb | Slice 3 384kb | Slice 4 384kb |
|---|---|---|---|---|
| Noon to 1 | XY | X | | |
| 1 to 2pm | X | | X | X |
| 2 to 3pm | XY | XY | X | |
| ... | | | | |
| ... | | | | |
| 11 to 12 Noon | X | X | | |

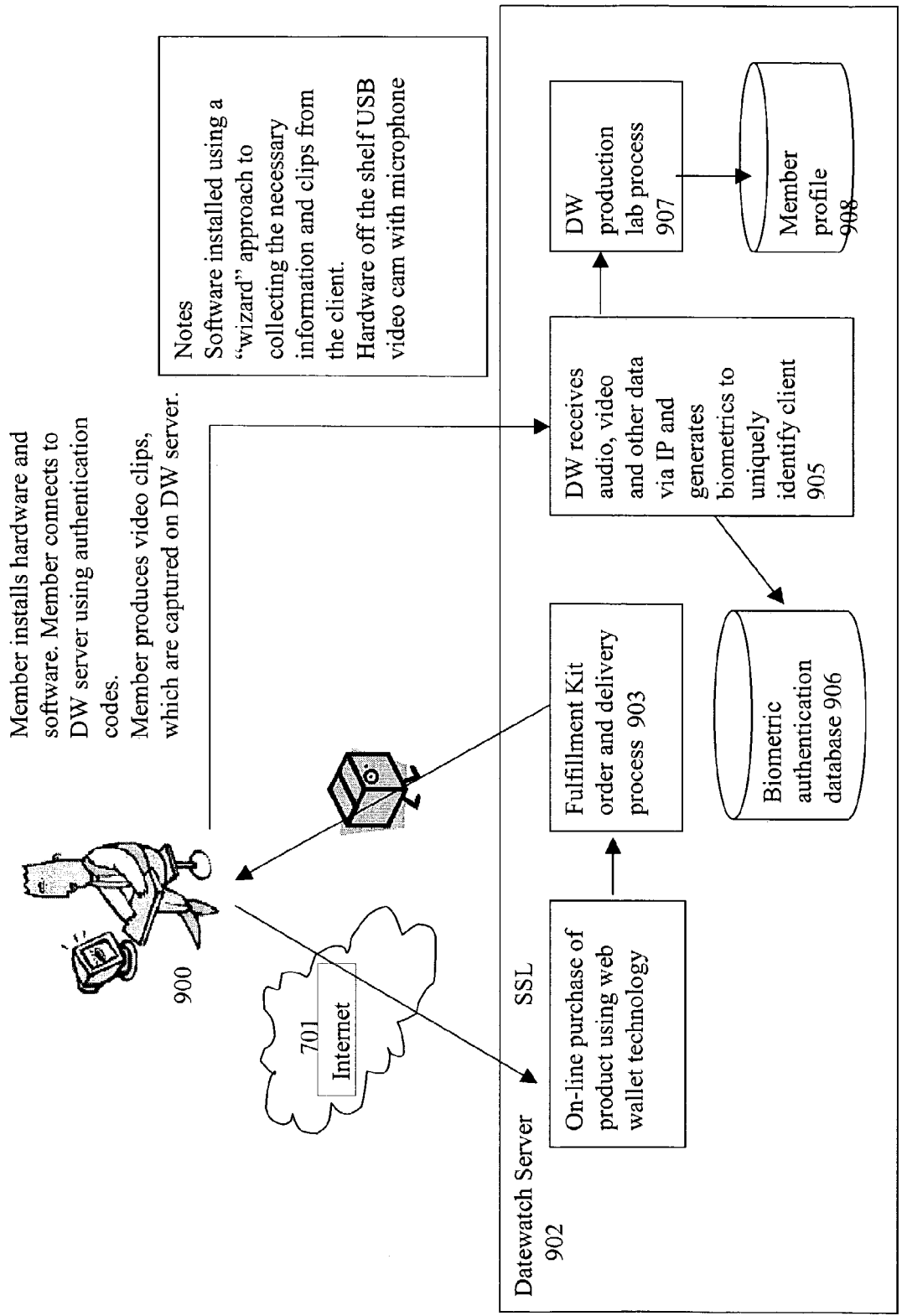
FIG. 9 Authentication and Member Profile

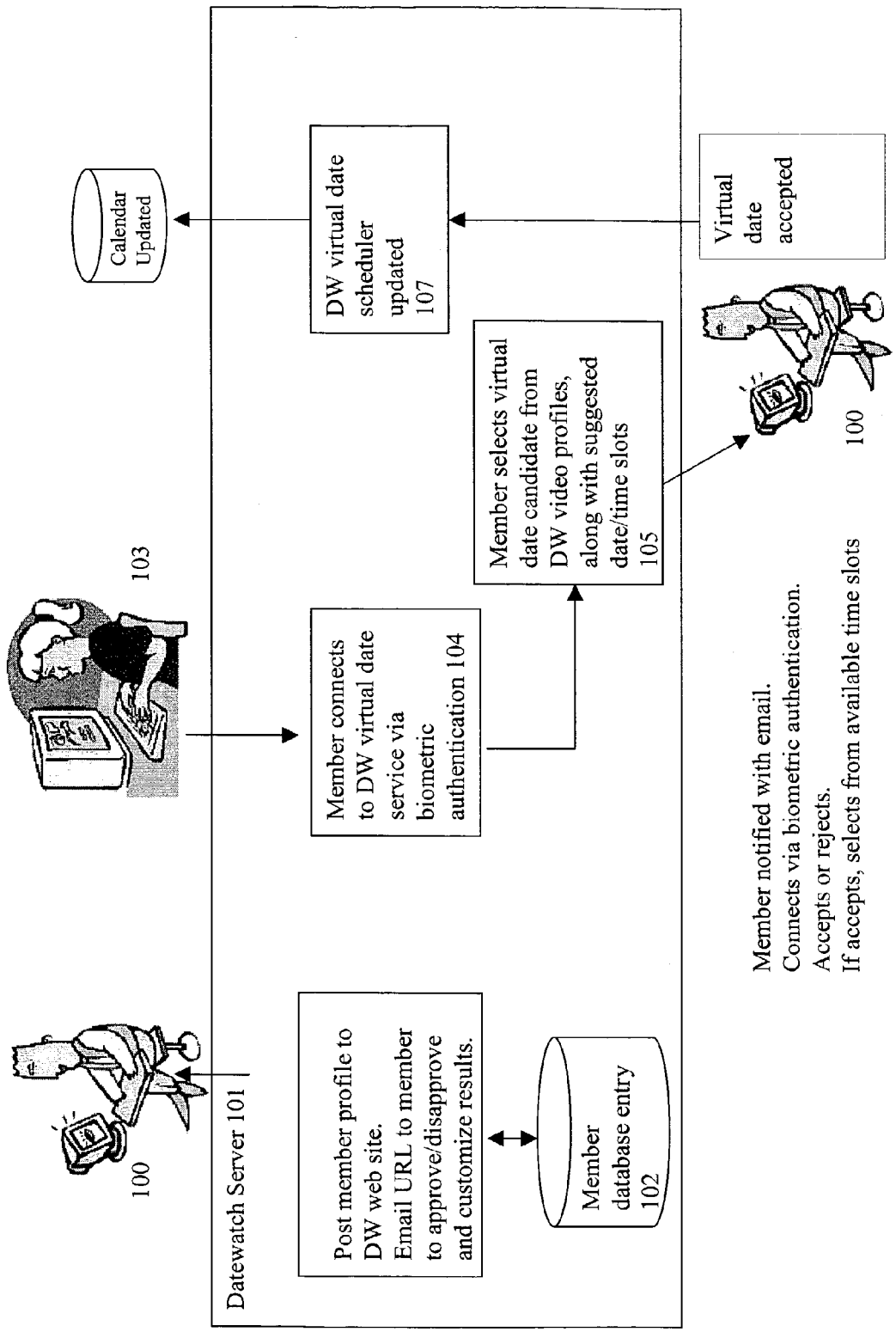
FIG. 10 Logon and Virtual Date

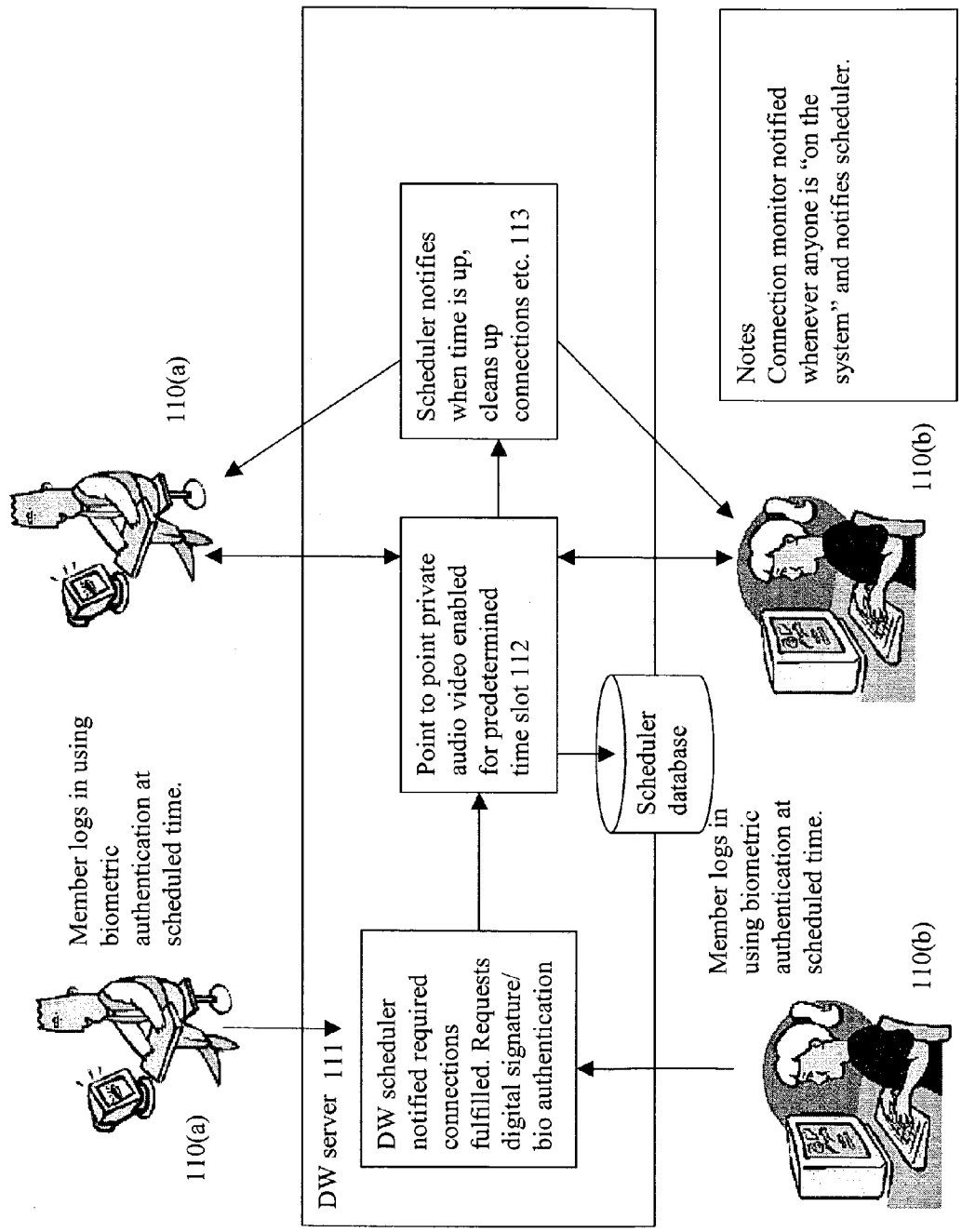
FIG.11 Virtual Date Scheduler

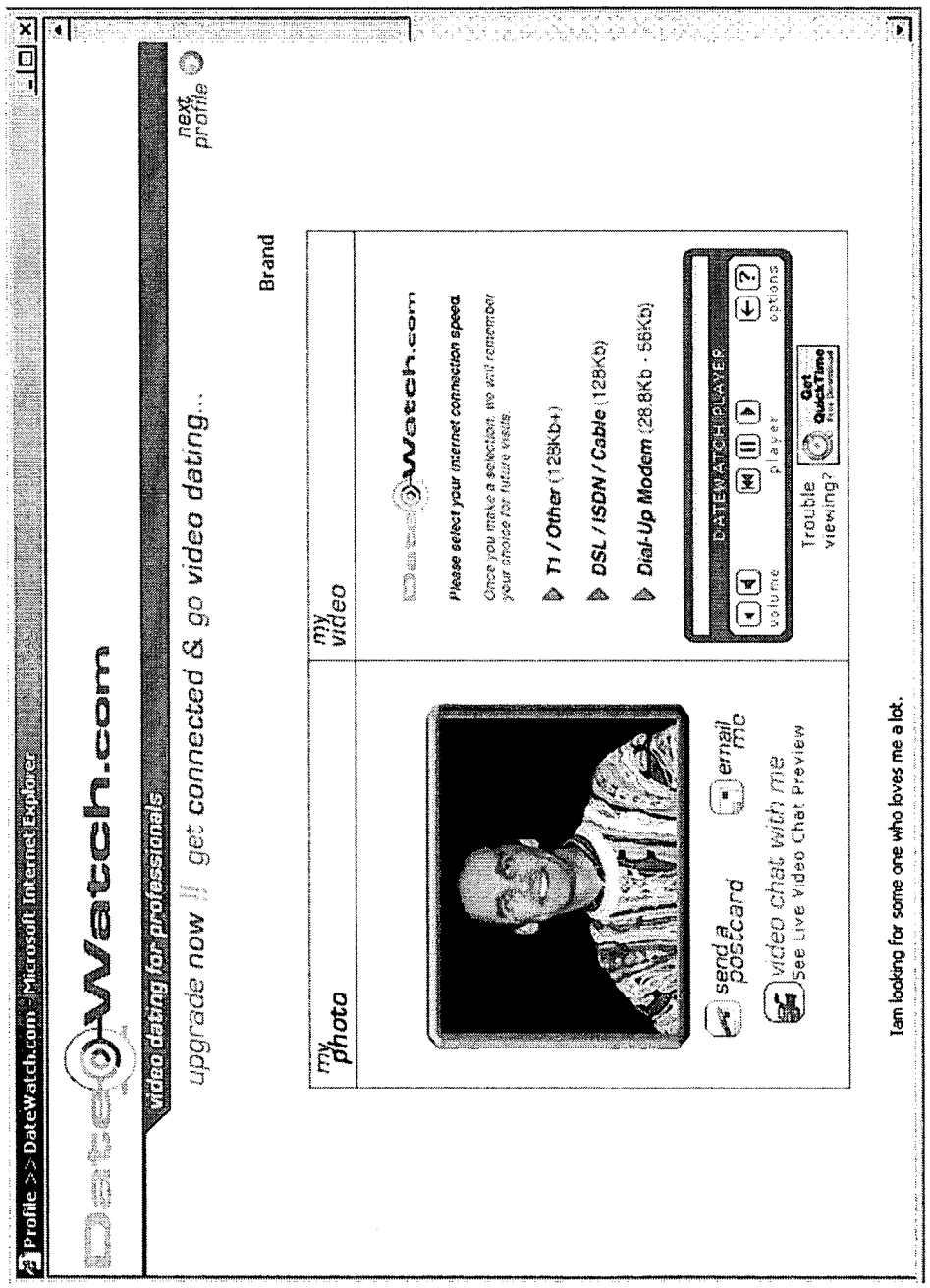
FIG. 12 Datewatch Player

METHOD FOR USER VERIFICATION AND AUTHENTICATION AND MULTIMEDIA PROCESSING FOR INTERACTIVE DATABASE MANAGEMENT AND METHOD FOR VIEWING THE MULTIMEDIA

This application claims the benefit of U.S. Provisional Application No. 60/373,697, filed Apr. 17, 2002 and No. 60/373,736, filed on Apr. 17, 2002. Both Provisional Applications are incorporated by reference as if fully set forth herein.

FIELD OF THE INVENTION

The present invention relates to a method and apparatus for communication between two or more users through a global computer information network such as the Internet. More specifically, this invention relates to the field of an interactive Internet personal security and identity verification and authentication, which verifies application information, creates a selectively approved populated membership database, authenticates each member, identifies preferences, a method and system for presenting the chosen profiles and preferences to other members, and a method and system for permitting members to virtually meet through the system.

BACKGROUND OF THE INVENTION

On-line dating services have been in operation for several years. People interested in meeting others have often found conventional online dating to be both rewarding and entertaining. Online dating services have become more and more popular and necessary in this day by the demographic and cultural changes, which make it difficult for likeminded people to meet. Accordingly, it is desirable to have some sort of system and method, which helps people meet each other.

Some conventional systems take advantage of telephone technology to aid in this process. In these systems, which typically involve the placement of personal ads or profiles on publication, a person wishing to meet another person must make a telephone call and listen to a prerecorded message left by another user of the service. A disadvantage of this service is that the user can only listen to messages and there are no visual aids to assist in the process. Furthermore, in most prior telephone systems, when the user has found a person they would like to meet, they are permitted to leave a message with the person they would like to meet. That person can then reply to the message. In reality, these telephone-dating services are little more than voice mail systems with some additional features.

Other systems have sprouted on the World Wide Web ("the Web"). In order to join an existing dating service on the Web, the user simply visits the website where she is prompted to enter personal information such as age, height, weight, hair color, eye color, and build, as well as geographic information, hobbies and other preferences. The user then becomes a member of the dating service, sometimes with a fee, and may receive and send contact information to and from other users of the service.

Unfortunately, because the Web is largely unregulated, as well as the information provided to the on-line dating services, there is no assurance that all the information entered by the user is accurate or reliable. Current Internet services omit large amount of social and legal information, leaving the member compromised with guess work, no personality information, no validity of currency of photo images, no legal identity, and alias information may affect candidate verification. As a result, the user may not really be who or what she claims to be. In addition, it is possible to enroll people with the service, without their knowledge or permission, as a joke for example.

Another disadvantage with current online dating services is that anybody can access the website using another user's password. Regardless of whether or not the user obtained permission to use the first user's password, the other subscribers to the service may be completely unaware that they are not communicating with the person the profile was created to represent.

Yet another disadvantage of current online dating services is that the use of video dating, or viewing others in real-time has resulted in uncontrolled porn social environments. There is very little accountability over offensive content flashed across the screen of an unsuspecting user.

Finally, the current system of viewing video of potential dates is very time consuming and inefficient, possibly taking weeks before a meeting can occur. In such cases, a person is required to go to a designated location and search through videos in order to find a particular person. A simple way of advancing through video to find particular characteristics of a potential date is limited by the technology used; current video dating services use videocassettes as a way of showing a member to another member. This process is time consuming because once a member discovers another whom she is interested in meeting, the dating service sends a postcard or notification to the individual notifying him that another member would like to meet him. He then must go to the same location and view the other member's video profile. If he decides that he would like to meet her, the office sends a postcard to her notifying her. This process could take weeks.

Another disadvantage of current online dating services is that they have not made good use of current technology and the power of the web. Specifically, current services have not effectively made user video profiles available to the other users of the service.

Thus, people realize that there is a need: 1) to assure the integrity of the information and the service; 2) to assure that the information represented by the user is true and accurate; 3) to provide better safety and security to the users of the service; and 4) to use advanced Web video and audio technology to facilitate on-line communication and dating.

SUMMARY OF THE INVENTION

It is therefore an object of the present invention to assist in ensuring that the profile created by the user is true and accurate through a verification process.

Another object of the present invention is to assure that the member represented by the profile is the actual user using the service through an authentication process.

Another object of the present invention is to provide a database search capability indexed by video objects and audio track content with "biotags" in membership audio and video communications and to enable member access to the audio/video.

It is another object of the present invention to create a method for controlling live video content management through mutual consent approvals, improving video quality and managing bandwidth, and creating accountability and control over live video chats.

Accordingly, in one aspect, this invention provides an interface available to the member to ascertain selective legal and security information for selective classification of database membership qualification.

In another aspect, this invention provides a method of positive identification of an online end user member through biometric authentication.

In a third aspect, this invention provides a method of improving search capabilities by creating a database wherein video and audio objects provided by the member are tagged for content.

In a fourth aspect, this invention provides a multimedia player or database containing biometric authentication, video on demand viewer and player, live broadcast of video on the Web, a communications application for interactive broadcast programming, and a database search application for locating specified video and audio content preferences.

Finally, it is an aspect of the invention to provide a method of controlling live video content and maintaining member accountability while improving video and audio quality by efficiently managing bandwidth of on-line communication with an digital signature and biometric authentication.

Thus this invention provides a method of verifying the identity of a potential user by matching historical records available from other agencies with data inputted to a secure Web server by the applicant; a method of biometrically authenticating a member when she logs on to the service; a method of creating a database search capability indexed by video objects and audio track content, "biotags", in membership audio and video communications; a method of calendaring bandwidth to assure improved video and audio quality, accountability and content management; and a multimedia player for accessing and using the service.

BRIEF DESCRIPTION OF THE DRAWINGS

The features of the invention will be more readily apparent from the following detailed description and drawings of an illustrative embodiment of the invention.

FIG. 1 is a simplified block diagram illustrating an exemplary method of membership identity verification, member authentication, member profile creation, and establishing a virtual date.

FIG. 2 is a simplified block diagram illustrating the exemplary method of membership identity verification operative in a manner consistent with the present invention.

FIG. 3 is a simplified block diagram illustrating the exemplary biometric authentication procedure and member profile set-up.

FIG. 4 is a simplified diagram illustrating the creation of a biometric authentication file.

FIG. 5 is a simplified block diagram of the Digital Video Lab.

FIG. 6 is a simplified block diagram of the exemplary Datewatch player including a description of the video database search and query procedure.

FIG. 7 illustrates an exemplary process flow for establishing a virtual date between members.

FIG. 8 illustrates the exemplary bandwidth schedule and management method, which ensures improved video and audio quality, content management, and member consent, during the virtual date.

FIG. 9 is an exemplary process flow of the Datewatch application, verification, authentication, and member profile production and posting process.

FIG. 10 is an exemplary process flow of a member logon and creation of a virtual date with another member.

FIG. 11 is an exemplary process flow of a virtual date between two members.

FIG. 12 is a view of the Datewatch application.

DETAILED DESCRIPTION OF THE PREFERRED EMBODIMENT

Consistent with the present invention, a method and apparatus are disclosed for an on-line communication and date service, which is capable of verifying application information on an interactive internet personal security and identity server for creating a selectively approved populated membership database, authenticating the member, searching specific profiles, identifying audio and video preferences, and efficiently calendaring, scheduling, and managing bandwidth for a virtual date.

Clearly, elements in accordance with the present invention may be embodied in a wide variety of forms, some of which may be quite different from those of the disclosed embodiments. Consequently, the specific details disclosed herein are merely representative; yet in that regard, they are deemed to afford a preferred embodiment for purposes of disclosure and provide a basis for the claims herein, which define the scope of the present invention.

FIG. 1 is a simplified block diagram demonstrating the steps of the Datewatch user verification, member authentication, search and query, and virtual date processes. The present invention utilizes a membership identity verification 100 to accurately verify a person's credibility and determine a person's character, and authentication 200 to authenticate that an applicant attempting to sign on to the Datewatch system is in reality the person the applicant claims to be. The applicant is required to input particular applicant information 101 such as the driver's license number, social security number, credit card information, etc. and the information is compared or matched to information obtained from a third party 102. If the information is deemed accurate via comparing and matching and the values of the data satisfy predetermined minimums, the applicant is accepted 103 as a member of the Datewatch dating service.

After the applicant has been accepted, thus becoming a member, and resolves to use the Datewatch service, the member must be authenticated 200 when he attempts to log on to the server. Membership authentication 200 is necessary to ensure that the member using the service is truly the person represented by the member profile. A biometric authentication process is used which uses audio and video data. The biometric data is obtained directly from member raw data 201, i.e., audio and video data, transmitted to the Datewatch Server. Portions of the raw files are processed and a biometric file is created 202. At the same time the same raw files are processed at a Digital Video Lab and tagged 203 for content identifying particular characteristics of the new member.

After the member has been verified, authenticated, and has posted a member profile 204 to the Datewatch Server, the member is permitted to search the Datewatch server for other members matching preferential characteristics. Using the Datewatch player incorporating both video and audio capabilities as well as search fields, the member may search through the member video and audio database by inputting specific preferential characteristics 301. The Datewatch server searches 302 the Datewatch database for identifying tags in the audio and video files tagged by the Digital Video Lab. A list of other members with video and audio files matching the preferential characteristics is presented to the member who may then view 303 the specific video and audio clips.

Once the member finds another member matching specific preferential characteristics the member can request a virtual date with the other member. A virtual date is a live audio and videoconference between at least two members of the Datewatch service. The first member sends a request 401 with a date and time to the second member and the second member may accept or reject 402 the virtual date. At the appropriate date and time, the members are connected 403 and the virtual date begins.

Referring to the embodiment depicted in FIG. 1, a Membership Identity Verification and Character Report process is illustrated wherein the customer with a client device 200, who wishes to sign on to the on-line dating service ("Datewatch"), establishes a connection with the internet and enters the Datewatch Website 202 via Secure Socket Layer SSL 201. It is pointed out that a client device can be a PC, set-top box, Internet-enabled television set, or Internet-enabled wireless communications device, as can be appreciated by those skilled in the art. These methods may be applied to new technology as the technology evolves. The Datewatch Website 202, run on the Datewatch Servers 204 requests personal information such as the applicant's name, address, social security number, and driver's license number and the requested information is transmitted to the Identification Process Controller 203, which launches Datewatch Identification process 205 which constructs an HTTPS request of this unique personal data information received from the applicant and transmits the data through a secured dedicated electronic frame relay circuit, or other conventional secured wide area network approved communications links, to a third party 206, for example the credit bureau or a government agency. The third party 206 receives the unique personal data information compiled by the query and matches data with the requested website 202 information and provides officially recorded public information for the individual given the driver's license, social security number, etc. The credit card or debit card number provided at the Datewatch website can quickly be compared and matched to the credit information provided on the credit report.

The third party 206 then transmits an HTTPS response containing these values via SSL 207 to the Datewatch Servers 204 where the Datewatch software compares the third party information with information provided by the potential member. The resulting data information results are passed through the Datewatch Identity Verification Algorithm to determine if the data provided by the applicant was sufficiently accurate to be considered for membership. Each individual criteria of information is independently compiled and scored, the total scores of each independent criteria are added together for a total passing or failing score on an evaluated numeric scale. In this particular embodiment, the Datewatch software comprises a Datewatch Identity Verification Algorithm (DIVA), which uses rules (mathematical formula criteria measurements) for approval or failure qualification. Examples of DIVA rules include: The applicant must enter full legal name, social security number, address, driver license, and credit card number; the full legal name, as required for input in the applicant form, must match exactly that of the legal owner of the social security number; the first initial and last name must match exactly to the owner of the driver's license (state obtained from address); the address must match exactly to that of the owner of the credit card account; the last name and address must match exactly to the owner of the credit card account; the applicant must stipulate that they are unmarried; the credit card purchase must be authorized.

For example, information such as applicant name, social security number, address, marital status, driver license, and credit card numbers from the third party are compared with the information that the applicant input on the Datewatch website 102. Values are given for each matching information.

In another preferred embodiment the applicant transmits only a portion of the social security number. For example, only the first five digits of the social security number is submitted, or the last four digits. No matter how many digits are submitted, the digits will still be matched and compared and they must correlate to the driver's license, credit card, phone number, and address records. This option might be a solution for people who prefer not to give out social security numbers.

Similar to identity verification, it would be beneficial to compile the applicant's character report to determine the applicant's character. Information such as aliases, judgments, lawsuits, marriage licenses, divorce decrees, physical address history, telephone number history, occupants of same address by male/female comparison, names of relatives, roommates, neighbors, bankruptcy filings, tax Liens, civil judgments, real property ownership, divorce records, identify theft report information, criminal background, county listing of record, arrest file, disposition date of sentence, national media service information, newspapers, magazines, and newswire files and other public social demographic information available through public records may be requested and obtained from a variety of sources and such information can be valued, scored, and matched to scaled measurement of acceptable criteria. Each information element criteria resulted is added up to a sum result. For example, an applicant's bankruptcy history may not preclude the applicant from membership, however, a criminal record may, depending on the degree. An applicant with a combination of bankruptcy, tax liens, and civil judgments may be precluded if the sum value of the information is greater than a predetermined maximum.

When all the information matches, and the values meet the predetermined scaled requirements, approval is granted. If the Datewatch software determines that at least one item does not match or that a value is deficient, approval will be denied and the applicant will be notified as an automated response in the application process. Meanwhile the credit card information is transmitted 211 via SSL for approval or denial. The results are transmitted back to the Identity Process Controller 203, which computes the final result. If approval is denied 202b, the applicant is notified either immediately through the Datewatch Website 202 or through the applicant's email account. When the credit card purchase has been authorized 202a and 208, the applicant's profile is posted 209 to the Datewatch Database 210, and the membership order notice 211 is sent to the Datewatch Server 204.

Referring now to FIG. 3. FIG. 3 is an exemplary block diagram of the method of creating a biometric authentication file. Upon membership approval 212, the Datewatch Server 304 causes a Fulfillment Kit 302 to be sent to the member. The Fulfillment Kit 302 contains a digital web cam, Compact Disc (CD) containing the Datewatch player software, a unique member user password and security authentication software, video conferencing software, a microphone, and a custom backdrop for video imagery and production. The Fulfillment Kit 302 is shipped to the member for specified recipient member delivery. The member installs 303 the CD software onto her client device 304; software to support the real-time streaming of audio video from their web cam microphone system, and the serial number installation CD to license the installation. The member 303 is prompted, using a "wizard" approach that prompts the user through the process 302, including logon authentication 303. The member then, through the use of a web camera, digital video device, or digital camera creates a video or photography file (video frame), and audio file that uniquely identifies the member's physical image and audio personal character information classified as raw content data. The Datewatch player is launched 304 and video and audio data are transmitted to the Datewatch Server, captured 305 and processed via the Digital Video Lab process 307. The serial number of the installation may be transmitted with the audio video stream as an additional security feature. Unique digital video and audio data are identified from the raw content produced by the member and a biometric element is created as "biotag" information. A preliminary member profile is generated and the resulting object stored in the Datewatch database.

In one embodiment, if the serial number is approved the Datewatch Server 304 transmits the encrypted unique biometric audio/video file processed at the Digital Video Lab 307 to the client device 304. The Datewatch software installed on the member's client device encrypts and stores the biometric file. To log on to the service, the member opens the player and enters a password and initiates the biometric authentication process by reciting the unique audio phrase on camera or into the microphone, or simply using the web cam to begin videoing the member. The biometric software on the client device captures the member's voice or video to compare the voice, speech, audio, digital photograph or video biometric biotag using conventional voice and image-processing algorithms. The biotag is defined as a sample of audio video (frames) of the member which has been processed using Fast Fourier Transforms, which turn digitized time dependent signals into wavelength/amplitudes, on a certain number of words and frames of video and storing them in a biotag object in the database Voice authentication (verification) is realized by doing the same process on the live (scripted) audio video stream and using cross correlation to compare the live with the archived tag. Audio files may be matched by measuring file sizes, sound frequency, decibel level patterns, time scale speech durations; all elements are mathematically measured, scored, and scaled generating acceptance or denial. Additional randomly generated multiple key word arrangements may be matched as partial file elements. For instance if the unique personal "biotag" reference data from the audio track is "blue dogs", the member receives biometric software with embedded audio content containing half the phrase with a single word "blue". Upon biometric initiation, the member's audio segment data, or word "blue", is transmitted over the internet to the Datewatch server and links to a unique related partial file, in this case, "dogs" matching frequency patterns, decibel level patterns, speech time duration, and file sizing calculations. The member's audio data information is parsed, valued, and scored and acceptance or denial granted.

Similarly, a digital photography image or video frame using a custom tagging template or mask, which digitally layers unique objects and shape characteristics isolated within the image, is referenced by color identification of pixel elements using the standard RGB colors spectrum to create a unique custom color chart file for each referenced member. As an example, the member transmits a photo image of himself or herself; a custom mask is digitally layered over the original produced facial image content, the mask highlights and isolates the shape of the eyes, hair, nose, etc., and color characteristics are captured. A reference file is created by parsing the color information, scaling the color characteristics, and creating a custom color chart for the identified object or "biotag". A combination of such authentication methods can be used. The Datewatch server can update individual member biometric information using revolving random "biotag" data by periodically transmitting new "biotag" components to the member's client device.

FIG. 4 represents another similar simplified exemplary block diagram for creating a biometric authentication file where the biometric authentication file is stored on the Datewatch Server 409. According to the summary in FIG. 4, the Datewatch server 409 notifies Datewatch to send a Fulfillment Kit 400 to the member. The member installs the Fulfillment Kit 400 onto her client device 401. A Datewatch multimedia player is launched 404 and video and audio data are transmitted to the Datewatch Server 409, captured 405 and processed via the Digital Video Lab 406. The Datewatch Server creates a unique biometric object 407 from raw data in the Digital Video Lab. Specifically, unique digital video and audio data is extracted from the raw content and the biometric object for the client is created and stored in the Biotag database 407. A preliminary member profile is generated and the resulting object stored in the Member Profile 408.

To log on to the service, the customer opens the Datewatch player and enters a password to initiate the biometric authentication. Biometric authentication is achieved by having the client recite an audio phrase on camera. The biometric software on the server captures the user audio-video feed, comparing it to the biotag in the system for that user. The authentication process compares the live audio, using proven voice authentication algorithms, and live video, using proven image-processing algorithms, to compare to the Datewatch biotag. Authentication requires a positive identification using this process. The Datewatch server 409 can periodically update individual member biometric information by capturing and processing new biotag components from the member's web cam.

FIG. 5 provides a summary of the Digital Video Lab 503. The Digital Video Lab 503 is used to enhance and improve the customer's image and audio quality data after it has been captured on the Datewatch Server 504. The Digital Video Lab 503 stores the profile on a database designed with a search capability indexed by video objects or shapes, photography images, audio track content, and "biotags". First, the customer produces a digital photography image or video, which is captured on the Datewatch Server 504. The Digital Video Lab 503 creates a preliminary profile 500 from which the customer may choose which photography image, video, and audio clips she would like on her member profile using the Datewatch player or web browser 501. The Digital Video Lab 503 performs nonlinear editing, blue screening, creates personal biometric data information rendering unique character references developed from photography images, video and audio track "biotags" in time code sequences, video and audio encoding, color and audio correction, watermarking, special effects, and encoding, as part of the video production process, and creates the "Sweetheart Finish" with embedded unique biometric reference information. When all the editing, corrections, and biometric tagging have been completed, the Digital Video Lab 503 transmits the lab processed video and audio to a third party video server 502. At this point, members are granted access to the interactive video file content through the Datewatch player and website 501.

FIG. 6 illustrates an exemplary Datewatch player's interactive video database query capabilities. The Datewatch web site player is a web page that contains a player plug-in which processes the audio video part, and other controls such as text, headers, preferences etc. In this embodiment, the member opens the Datewatch player 601. The Datewatch player 601 is designed with volume control, digital audio equalizer, video fast forward, rewind, and play and incorporates multiple blank fields for entering text data preferences for a membership search. As explained in FIG. 5, the Digital Video Lab 503 identifies "biotags" in each member's video and audio profile. For instance, while reviewing the video and audio files, the processors identify and mark all potential member identifiers such as hair color, eye color, physical characteristics, personal belongings, hobbies, activities, etc.

Members input preferences into preference search fields incorporated into the Datewatch Player 603. The text data is transmitted via HTTP through programmed XML instructions or schema elements and executes matching of photography images, video frames, or video and audio content "biotags" in the Datewatch database 605. As described above, "biotags" are unique tracks previously identified and rendered in lab processing that are correlated and matched with unique IDs such that SQL or XML queries may quickly and efficiently fetch the requested information. The video and audio data results are sent back to the Datewatch player 603.

Accordingly, as an example, a member interested in meeting another member who owns a dog and enjoys hiking and boating can enter those preferences in the player 603 preference search locator and search through the Datewatch database 604 for video, photography, text and audio matching those preferences. The Datewatch player will provide all related photography images, video, text and audio media specified to time code information on the subject requested within the existing entire video clip of each member.

In another embodiment, the method of using nonlinear video and audio tracks characterizing unique data elements selected between two points on a timeline as "biotags" on raw data files can be used to identify particular properties or characteristics of any kind of personal property, for example a home, car, or a boat. Accordingly, a member can transmit raw data files of personal property that he would like to sell. Another member or user can enter specific preferences of what he would like to buy and specific video clips can be presented for the second user to view and determine if he wants to buy it. This method would be particularly useful in second-hand sales.

FIG. 7 illustrates an exemplary virtual date through the Datewatch player 702a and 702b. This process creates a method for controlling live video content through mutual consent and creates accountability for those users. When a virtual date has been created a digital calendar is created and serves as an audit report of the pre-arranged mutual date. The audit report preserves proof that the members accepted the terms of the agreement and a biometric authentication file as proof that the members were in fact the ones who consented to the terms or use.

The virtual date is a two-way video communication between at least two members of the service. In most circumstances, the virtual date option arises after a member has reviewed video and/or audio, and text profile information about another member of the service and has a desire to meet the member virtually over the Internet. After the member has logged on to the Datewatch web site through the client device 703, entered the password, and passed the biometric authentication security, the member identifies, through the Datewatch player, another member to meet with. He sends a request, executing consent and acknowledgement to participate in a virtual date, 704 to the Datewatch Server 705 indicating at least one date and time for the virtual date. The Datewatch Server 705 sends the request for a virtual date 706 to the second member 708. The second member 708 then has the option of reviewing the first member's 701 profile as well as the first member's 701 video and audio data. If the second member 708 is interested in meeting the first member 701, she can send an executing consent and acknowledgement 709 to participate in a virtual date to the Datewatch Server 705. The response 710 is sent to the first member 701 with a password. The first member 701 confirms the virtual date and time 711 by responding to the second member's response 709. The confirmation is sent to the second member with a password 712. It is also possible that once the second member consents to a virtual date with the first member a confirmation and password is automatically sent to both members.

When the date and time has arrived, the members log on to the service, the scheduler is notified that the connections are filled, and the Datewatch Server 705 notifies the members when each has logged on. The members enter the passwords, read the disclosure agreements of acceptance, submit digital signature approvals, pass biometric authentication, and they are able to begin their virtual date.

In a preferred embodiment the biometric authentication occurs at the moment when the member accepts the terms of the virtual date. Specifically, when the member points the mouse cursor at the "I Accept" box, the digital video camera, or web cam, takes a picture of the member and the Datewatch software transmits the photography image, or the video frame, to be authenticated in the same way the member is authenticated for logon. Upon authentication, the digital signature and biometric file from the web cam is stored as an audit log for proof that the member accepted the terms of the virtual date.

In another embodiment the virtual date begins with a member purchasing virtual date minutes. He locates an interesting member and selects a time and date for a virtual date. At that point the member is presented with a legal consent agreement and confirms the agreement with a digital signature or electronic signature, while at the same time, becomes biometrically authenticated through the same process described above for the logon authentication. An audit log is created to file the signatures and the biometric file. Finally a message is sent for a date request to the other member and the receiving member repeats the process. When mutual consent has been recorded in the audit log, the connection is established, the bandwidth is allocated and the members begin the virtual date.

In another circumstance, both members may be logged on at the same time. Starting a virtual date can also be accomplished immediately. For instance, if two members are communicating by audio only or by instant messaging, they may request an instant password and if bandwidth is available, the members can begin the virtual date immediately, after accepting the terms and passing the biometric authentication audit controls, rather than setting up a virtual date at some time in the future.

Virtual dating takes up bandwidth, which is preferably managed in an efficient way by the service. FIG. 8 illustrates an exemplary way of calendaring bandwidth (scheduling bandwidth) to ensure quality video and audio during the virtual date. In order for both the video and the audio to appear clear and make the virtual date enjoyable, a minimum amount of bandwidth is required. When bandwidth is burdened with excessive concurrent use the picture quality, as well as the audio quality, degrades.

According to this embodiment, members interested in a virtual date may purchase prepaid minutes, for instance, $19.95 for 30 minutes, $29.95 for 60 minutes or $49.95 for 120 minutes and calendar bandwidth for their virtual date or conference, or the members can pay for the minutes as they are used. The calendar is a matrix consisting of essentially four matrix calendars per time zone; Eastern, Midwest, Mountain, and Pacific. The horizontal columns are bandwidth sectors of 384K. As an example, assuming Datewatch purchases bandwidth equivalent to 14 megabits, at 384K bits, there are twenty-six columns, or the ability to allow thirteen concurrent virtual dates or conferences. The rows of the matrix are in minutes, allowing virtual date or conferencing in combinations of ten, fifteen, and thirty-minute blocks.

The user selects a date and time of the virtual date or conference call, and one or more alternate dates and times, and selects the minutes requested for the virtual date or conference. The request for the virtual date or conference is sent to the scheduler which checks the queue for that time slot for availability of two members or two 384 kb slots. If the slot is open the request is sent to the second member and the second member responds with either an approval or a denial. If the slot is not available, the calendar matrix checks the availability of alternate dates and times. The request is sent to the calendar manager if the date and time is approved. The time block is reserved and a confirmation and password is sent to both members. The server may also send a reminder to the members before the scheduled time. Once the time block has been reserved, the time is permanently allocated and prepaid minutes are subtracted from the members profile balance of prepaid minute credits and are allocated and to the time slot segment mutually requested by both consenting parties to the conference meeting. There are no refunds, or cancellations.

FIG. 9 illustrates an exemplary diagram of the Datewatch application, verification, authentication, and member profile production and posting process. First, the applicant 900 connects to the Internet 901 to visit the Datewatch website. The Datewatch Server 902 obtains the applicant information and approves or denies applicant membership based on the predetermined criteria discussed in FIG. 2. After applicant approval and on-line purchase, the member is sent a Fulfillment Kit 903 containing the hardware and software. The member installs the hardware and software and connects to the Datewatch Server to transmit to the Datewatch Server video, audio, photographic, and text clips. The Datewatch Server receives audio, video, and other data 905 via IP and generates biometrics to uniquely identify the member. The video, audio, and other data are processed at the Digital Video Lab 907 and tagged for member identifiers. Finally, the member profile 908 is posted to the Datewatch database.

FIG. 10 is an exemplary flow of a member logon and creation of a virtual date with another member. The first member 100 has his member profile posted on the Datewatch Server 101. The first member 100 may view his member profile and approve or disapprove and customize his profile. The second member 103 connects to the Datewatch Server via her biometric authentication 104 and begins her search for another member with particular character preferences. The second member 103 selects a virtual date candidate 100 from the Datewatch video profiles along with suggested date/time slots. The virtual date candidate 100 is notified via email that another member would like a virtual date. The virtual date candidate 100 connects to the Datewatch server via the Internet and the biometric authentication, views the second member's 103 profile, and accepts or rejects the virtual date. If he accepts, he selects from one of the available suggested date/time slots. If the virtual date is accepted, the Datewatch virtual date scheduler is updated 107.

FIG. 11 is an exemplary flow of the virtual date. At the time of the virtual date both members 110(a) and 110(b) log on to the Datewatch Server 111. The Datewatch scheduler is notified when the required connections are fulfilled. The Datewatch scheduler initiates the virtual date software between the two members 110(a) and 110(b) requiring an electronic signature consenting to the terms of the use and biometric authentication for the audit log. As described earlier, the virtual date scheduler and calendar helps control live video content through mutual consent, thus creating user accountability for the content displayed and discussed during the video date. A digital signature is created before the beginning of the virtual date when the members consent to the terms and conditions of the use. The calendar system creates an audit report of the pre-arranged mutual date and consent. The Datewatch Server enables point-to-point private audio and video for a predetermined time slot according to the scheduler database. The two members 110(a) and 110(b) continue their virtual date until the Scheduler 113 notifies the members that their time is up.

Those of ordinary skill in the art should appreciate that variations to and modification of the above-described methods may be made without departing from the inventive concepts disclosed herein. Accordingly, the invention should be viewed as limited solely by the scope and spirit of the appended claims.

What is claimed is:

1. A method for uniting members of a selective databse through a global computer information network, comprising the steps of:

transmitting personal information of a potential member from a first processing unit through said network to a second processing unit;

verifying said personal information;

if verified, allowing said potential member to become a member;

collecting raw data from said first processing unit;

processing said raw data on said second processing unit to identify and create biometric identifiers, including an authenticating biometric file, from said raw data to create a member profile, which includes the processed raw data;

creating a database searchable by said biometric identifiers;

during log-in, authenticating said member by comparing data captured at log-in with the authenticating biometric file;

if authenticated, allowing said member to search said database;

transmitting requests for a virtual meeting from a first member to a second member; and determining a time for said first member and said second member to conduct said virtual meeting.

2. The method of claim 1, wherein said verifying step includes the step of connecting to a third party data processing unit to determine veracity of said personal information.

3. The method of claim 2, wherein said verifying step determines veracity by comparing said personal information with said information from said third party.

4. The method of claim 3, further comprising the steps of:
assigning a predetermined value to said information from said third party;

summing the predetermined values assigned to said information; and granting membership status when the sum of the information is at a certain level.

5. The method of calim 1, wherein the user inputs a credit card number the inputting personal information step and the verifying step verifies the user's credit card number with a credit card number obtained from the third party.

6. The method of claim 1, wherein the computer biometrically authenticates the member by comparing unique color identification and/or unique object and shape characteristic comparisons with the authenticating biometric file.

7. The method of claim 1, wherein the biometric identifiers identify the member's physical characteristics.

8. The method of claim 1, wherein the authenticating step determines at least one of a file size, sound frequency, decibel level patterns, or time scale speed durations of a biometric input of the member upon log-in and the member is granted access if it is determined that at least one, or any combination, of the file sizes, sound frequencies, decibel level patterns, or time scale speech durations of the member's biometric input and biometric identifier substantially match.

9. The method of claim 1 wherein the step of creating a database searchable by biometric information further comprises the steps of:
   identifying biometric identifiers in said raw data; and
   tagging the biometric identifiers in said raw data.

10. The method of claim 9, further comprising the step of performing at least one of non-linear editing, blue screening, audio and video corrections and watermark finishing.

11. The method of claim 1, further comprising the step of periodically updating the authenticating biometric identifier.

12. The method of claim 1, wherein the allowing said members to search through said database step further comprises the step of searching said database for other members' biometric information and returning a list of multimedia previously biometrically tagged with said biometric identifiers to said searching member.

13. The method of claim 1, further comprising the step of outputting a confirmation and password to said first and second members of the date and time to begin the virtual meeting.

14. The method of claim 1, further comprising the steps of transmitting a first request time and a second request time to the second member and transmitting a confirmation and password to both members after the second member has chosen one of the first or second request times.

15. A method for identifying a member of a selective database through biometric authentication comprising the steps of:
   transmitting raw data from a first processing unit to a second processing unit;
   extracting from said raw data at least one video, photography, or audio track;
   processing said raw data on said second processing unit to identify and tag said raw data for identifying member characteristics and to create an authenticating biometric identifier, wherein said tagged raw data is used to create a member profile, which is searchable by other members; and
   granting access to a database when a biometric input at log-in from the member substantially matches the authenticating biometric identifier created from said raw data.

16. The method of claim 15 further comprising the step of creating an audit log comprised of a digital signature and a member's biometric authentication file created at substantially the same time as the digital signature.

17. The method of claim 15, wherein the biometric identifiers comprise tagged raw data for identifying member characteristics, wherein the member profile is stored on a database, which is searchable by the tagged raw data.

18. The method of claim 16, wherein the audit log is created after the member has been authenticated at log in.

19. A method for uniting members of a selective database through a global computer information network, comprising the steps of:
   transmitting personal information of a potential member from a first processing unit to a second processing unit;
   verifying said personal information;
   if verified, allowing said potential member to become a member;
   collecting raw data from said first processing unit;
   processing said raw data on said second processing unit to identify and create biometric identifiers, including an authenticating biometric file, from said raw data to create a member profile, which includes the processed raw data;
   creating a database searchable by said biometric identifiers;
   during log-in, authenticating said member by comparing data captured at log-in with the authenticating biometric file;
   if authenticated, allowing said member to search said database;
   transmitting requests for a virtual meeting from a first member to a second member;
   determining a time for said first member and said second member to conduct said virtual meeting; and;
   creating an audit log of the virtual meeting.

20. The method of claim 19, wherein the audit log comprises a consenting biometric authentication file given by the member as proof that the member consented to predetermined terms of meeting over the network, and that the member actually was the member meeting over the network.

21. The method of claim 19, wherein the audit log is created periodically during the virtual meeting.

* * * * *